(12) United States Patent
Zuiderweg et al.

(10) Patent No.: US 9,881,400 B2
(45) Date of Patent: Jan. 30, 2018

(54) METHOD FOR MEASURING A HIGH ACCURACY HEIGHT MAP OF A TEST SURFACE

(71) Applicant: MITUTOYO CORPORATION, Kanagawa (JP)

(72) Inventors: Adriaan Tiemen Zuiderweg, Breda (NL); Johannes Anna Quaedackers, Veldhoven (NL); Harm Visscher, Tilburg (NL)

(73) Assignee: MITUTOYO CORPORATION, Kanagawa (JP)

( * ) Notice: Subject to any disclaimer, the term of this patent is extended or adjusted under 35 U.S.C. 154(b) by 373 days.

(21) Appl. No.: 14/808,230

(22) Filed: Jul. 24, 2015

(65) Prior Publication Data

US 2016/0027194 A1    Jan. 28, 2016

(30) Foreign Application Priority Data

Jul. 25, 2014 (EP) .................................... 14178509

(51) Int. Cl.
*G06T 11/20* (2006.01)
*G01B 11/24* (2006.01)
*G01B 11/245* (2006.01)

(52) U.S. Cl.
CPC .......... *G06T 11/206* (2013.01); *G01B 11/245* (2013.01); *G01B 11/2441* (2013.01); *G01B 2210/52* (2013.01)

(58) Field of Classification Search
CPC .............. G01B 11/2441; G01B 11/245; G01B 2210/52; G06T 11/206
USPC ........................................................ 345/440
See application file for complete search history.

(56) References Cited

U.S. PATENT DOCUMENTS

| 4,358,201 A | 11/1982 | Makosch |
| 5,471,303 A * | 11/1995 | Ai ...................... G01B 11/2441 356/497 |
| 6,185,315 B1 * | 2/2001 | Schmucker ............ G06T 11/00 356/450 |
| 7,605,925 B1 * | 10/2009 | Chen .................. G01B 11/2441 356/497 |
| 2017/0268872 A1 * | 9/2017 | Deichmann ........ G01B 11/2518 |

OTHER PUBLICATIONS

Search Report for EP14178509, dated Nov. 12, 2014.

* cited by examiner

*Primary Examiner* — Mark Hellner
(74) *Attorney, Agent, or Firm* — Greenblum & Bernstein, P.L.C.

(57) ABSTRACT

Method for measuring a height map of a test, including measuring a coarse height map of the test surface with a pre-map sensor provided to an optical profiler with a relatively long working distance and/or a large field of view, storing the coarse height map in a memory, subdividing the coarse height map into sections appropriate for the field of view of a high resolution optical profiler sensor provided to the optical profiler, calculating corresponding X, Y and Z positions for the optical profiler sensor with respect to the test surface, calculating a trajectory in the X, Y, Z-direction for the optical profiler sensor with respect to the test surface using the calculated X, Y, Z-positions, moving the optical profiler in the X, Y, Z-direction with respect to the test surface according to the trajectory, and measuring a high accuracy height map with the high resolution optical profiler sensor.

20 Claims, 6 Drawing Sheets

METHOD FOR MEASURING A HIGH ACCURACY HEIGHT MAP OF A TEST SURFACE

CROSS-REFERENCE TO RELATED APPLICATIONS

The present application claims priority under 35 U.S.C. § 119 of European Application No. 14178509.7, filed on Jul. 25, 2014, the disclosure of which is expressly incorporated by reference herein in its entirety.

BACKGROUND OF THE INVENTION

1. Field of the Invention

The invention relates to a method for measuring a high accuracy height map of a test surface using a multi sensor optical profiler.

2. Description of Related Art

Typically for 3D optical profiling systems is that the height map accuracy has an inverse relation to the vertical scan range and vertical scanning speed. A high accuracy optical profiler sensor may have a limited field of view, for example the field of view may be 0.1*0.1 mm while the test surface may be much larger. Therefore there is a need to move the test surface underneath the sensor from a first section of the test surface to a subsequent section of the test surface so that multiple height maps may be combined together to make a measurement of the total test surface possible. If for each height map the operator has to automatically or manually find the position in which the test surface is within the depth of focus and scan range (if appropriate) of the sensor it may take a long time to measure the total test surface.

SUMMARY OF THE INVENTION

There has arisen a need for an improved method for measuring a high accuracy height map of a test surface using an optical profiling sensor in which the time for positioning the test surface within the focal range of a high-accuracy optical profiling sensor is minimized.

There is therefore a need to provide an improved method for measuring a high accuracy height map of a test surface using an optical profiler.

Accordingly there is provided a method for measuring a high accuracy height map of a test surface using a multi sensor optical profiler, including: measuring a coarse height map of the test surface with a pre-map sensor provided to the optical profiler with a relatively long working distance and/or large field of view; storing the coarse height map in a memory; subdividing the coarse height map into sections as appropriate for the field of view of a relatively high resolution optical profiler sensor provided to the optical profiler; calculating the corresponding X, Y and Z positions for the high resolution optical profiler sensor with respect to the test surface; calculating a trajectory in the X, Y, Z-direction for the high resolution optical profiler sensor with respect to the test surface using the calculated X, Y, Z-positions; moving the optical profiler in the X, Y, Z-direction with respect to the test surface according to the trajectory; and, measuring a high accuracy height map with the high resolution optical profiler sensor.

Fast measurement of the high accuracy height map can be accomplished by using two height sensors; a pre-map sensor that is fast, has a long focal range, and long working distance, to pre-map the test surface and a second sensor (optical profiler) that has a high height measurement accuracy for the high accuracy height map.

With the aid of the pre-map sensor the distance between the test surface and the pre-map sensor may be measured up front. The measured distance may be used to move the test surface within the limited focal range of the high-accuracy sensor. The high-accuracy sensor may therefore be directly used for measuring while no time to find the test surface within the focal range is wasted.

According to a feature, the pre-map sensor includes a confocal sensor, a triangulation focus sensor, a knife edge focus sensor, a chromatic point sensor, a confocal sensor, a points from focus sensor, a structured illumination microscopy sensor, a vertical image contrast through focus sensor, lateral image contrast through focus sensor, a tactile sensor, or a capacitive sensor. Other fast focusing methods are not excluded.

According to a feature the coarse height map from the pre-map sensor may be composed of multiple merged, overlaid or joined individual measurements from the pre-map sensor.

The pre-map sensor ideally would produce a coarse height map. Please note that a fast single point focus sensor may also be used to create height maps by combining multiple measurements or an array of multiple sensors. Multiple fields of view of the pre-map sensor might be connected to enhance the measurable area.

The area of interest of the pre-map sensor height maps result is subdivided in connected or overlapping areas of the size of the high accuracy height map sensor field of view. The pre-map sensor height maps may be used to determine appropriate start and end positions of the focal scan for subsequent measurements using a second higher accuracy optical profiler. In an optimal configuration the system may map the area of interest first entirely using the pre-map sensor and then switch to a high accuracy sensor to map the same area with the higher accuracy. The field of views of both sensors might differ, but this is no limitation for the method. The benefit of using two sensors is that the pre-map data is used to ensure that the slower higher accuracy method is optimized in terms of scan range and thereby a substantial gain in measurement speed and robustness can be achieved. Another key element is that this combined measurement scheme is very suitable for automation.

Other less optimal measurement schemes however are not excluded. The measurements of single fields of view are also not excluded as this also would benefit of using a first sensor for the purpose of fast and robust auto focussing.

The subsequent high accuracy height measurements might be done using high accuracy scanning 3D optical profiling method including: structural light illumination profiling, point from focus profiling, spinning disk (Nipkow) confocal profiling, single point confocal profiling, digital holography profiling, interferometry profiling. Other fast height optical height mapping methods are not excluded.

All different combinations of any pre-map sensor with any high accuracy sensor would be possible. The pre-map sensor might share partially the same optical path with the high accuracy sensor.

If the final high accuracy height maps overlap they might be combined into one larger height map using height map stitching methods. If the high accuracy height maps are connected they might be combined into one larger height map directly.

If the final high accuracy height maps are not overlapping and not connected they might be combined into on one larger height map by interpolating the gaps between them.

If the height drift is large the predicted scan range obtained from the pre-map data might not be adequate at the time of the second scan and the measurements might fail. These errors can be pre-empted by compensation using the offset between the pre-map data and the last high accuracy height scan.

According to a feature the movement of the test surface with respect to the optical profiler apparatus may be actuated by X, Y and Z stages.

In this way different areas of the test surface may be positioned underneath the optical profiler apparatus. In any case a computer controlled (X, Y, Z) movement system to move the test sample with respect to the sensors may be required. One can move the sample in (X, Y, Z) or the sensor in (X, Y, Z) direction. Other schemes are however also possible. For instance, it is possible to move the sample in XY and the sensors in Z direction. It is also possible to move the sample in Z direction and the sensor in XY direction. Other motion combinations are not excluded.

According to a feature the method for calculating a trajectory in X, Y and Z includes randomizing the order in which the high resolution sensor is measuring a height map of the sections.

When stitching multiple overlapping fields of view a tilt error might be introduced. Such errors occur if there is a strong correlation between the height drift of the system and the measurement order of the fields of view. Such height drift might be caused by environmental temperature changes or by internal heating in the light path or other sub systems (mechanical or electrical). By randomly measuring the fields of view this effect can be minimized. In the pre-map focusing strategy randomizing the order in which the high accuracy height maps fields are measured is possible.

According to a feature the method for calculating a trajectory in X, Y and Z includes ordering the trajectory.

By ordering the trajectory the measurement time of the entirety of the test surface is minimized.

According to a feature the subdivision of the coarse height map into sections as appropriate for the field of view of the high resolution optical profiling sensor results in the sections overlapping or adjoining.

According a feature calculating a trajectory in the X, Y, Z-direction for the high vertical resolution sensor includes subtracting the calibrated distance between the pre-map sensor and the high resolution sensor from the coarse height map.

The high vertical resolution sensor and the pre-map sensor might be completely separated as the (X, Y, Z) offset between the sensors can be well calibrated.

According to a feature measuring a high accuracy height map of the first section of the test surface includes scanning the test surface through the focal range of the high resolution optical profiling sensor.

According to a feature the high resolution optical profiling sensor is a white light interferometry sensor, a phase-shifting interferometry sensor or a wavelength scanning interferometry sensor, a confocal sensor, a points from focus sensor, or a structured illumination microscopy sensor.

According to a feature there is provided: allowing a user to view an image created by the pre map sensor; allowing the user to select or deselect areas of interest from the image created by the pre-map sensor, for example, to avoid stitching problems.

When stitching overlapping fields stitching errors will occur if there is missing or false data in the overlapping areas. Typical missing or false data can be is caused by: local differences in sample reflectivity, local sample angles beyond the angular limitation of the optical system, or shadow effect of large steps in the sample. The stitching problem areas can be detected by analysis of the pre-map data. This opens possibilities to pre-empt these stitching error during the final scan with the optical profiler. By adding additional fields of view, shifting the field of views for the optical profiler, or measuring the area concerned repeatedly with different intensities and merging these, stitching errors can be avoided by ensuring that valid data does exist in the overlap areas.

According to a feature the pre-map sensor includes a triangulation sensor. The pre-map sensor may include a radiation system to direct a radiation beam onto the test surface and a detector to receive a reflection of the radiation beam of the test surface. The position on the detector where the reflection on the detector is received is an indication of the distance between the pre-map sensor and the test surface.

The radiation system may be a lamp, a light emitting diode, or a laser. The radiation system may provide a broadband radiation beam.

According to a feature the pre-map sensor includes a knife edge focus sensor, for example, using a Foucault configuration.

According to a feature the pre-map sensor includes a chromatic point sensor.

According to a feature the pre-map sensor includes a tactile sensor.

According to a feature the pre-map sensor includes a capacitive sensor.

According to a feature the pre-map sensor includes a confocal type of sensor.

In one of the features, the high accuracy optical profiler may be an interferometer apparatus. To generate an interference signal of a test surface of a sample including: a broadband illuminator to provide a broadband illumination beam; a beam splitter to split the broadband illumination beam in a reference beam for reflection on a reference reflector and a measurement beam for reflection on the test surface via an objective having a focal range; and, a detector to receive an interference signal created by interference between the reference beam reflected from the reference reflector and the measurement beam reflected from the test surface.

A computer-controlled accurate (X, Y, Z) table to position the sample with respect to the detector. The detector might also be moved. Also combinations of sample and sensor movements are possible.

The interferometer apparatus may for example be a broadband interferometer, e.g. a Mirau, Michelson and/or Linnik interferometer apparatus.

The interference signal received on the detector has a maximum value when the distance of the reference beam is equal to the distance of the measurement beam. A scanning means may change the distance between the test surface and the apparatus with a view hundreds of micrometers around this maximum value to determine a height map of the surface. The apparatus therefore has a limited depth of focus around this maximum value and it may take a while to get a test surface within the scanning range of the scanning means if one doesn't have a rough indication of where the test surface is.

In one of the features, the high accuracy 3D sensor might be a spinning disk confocal (Nipkov) apparatus, programmable array confocal apparatus, or single point confocal apparatus.

In one of the features, the high accuracy 3D sensor might be a Shape From Focus (SFF), also known as Points From Focus (PFF), sensor.

In one of the features, the high accuracy sensor might be a structured illumination apparatus. The illumination beam may have a sinusoidal spatial pattern in at least two directions perpendicular to an optical axis of the illumination beam, and which is moved to different spatial pattern positions. The test surface may be scanned along said optical axis in different scanning positions. A fixed relationship between a moving distance between subsequent spatial pattern positions, and a scanning distance between subsequent scanning positions exists. The light reflected by the surface is detected in scanning positions with the spatial pattern having corresponding spatial pattern positions.

In one of the features the high accuracy optical profiler may be a digital holography apparatus.

In one of the features the high accuracy optical profiler may be any optical profiler with higher accuracy than the pre-map sensor used.

According to a further embodiment there is provided a method for measuring a height map of a test surface using a multi sensor optical profiler, including: illuminating a portion of the test surface with a pre-map sensor provided to the optical profiler; measuring a radiation intensity received from the portion of the test surface with the pre-map sensor; combining the measured radiation intensity with a priori information concerning the interrelation of illumination characteristics of the pre-map sensor and high resolution optical profiler sensor, enabling the calculation of a required illumination setting for illuminating the portion of the test surface with the high resolution optical profiler sensor; alternatively, calculating a ratio of the radiation illuminated on the portion and the radiation received from the portion; combining this with a priori information concerning the interrelation of illumination characteristics of the pre-map sensor and high resolution optical profiler sensor, enabling the calculation of a required illumination setting for illuminating the portion of the test surface with the high resolution optical profiler sensor; illuminating the portion of the test surface with the required illumination setting with the high resolution optical profiler sensor; and, measuring a high accuracy height map with the high resolution optical profiler sensor.

By calculating the ratio of the radiation illuminated on the portion and the radiation intensity received from the portion it becomes possible to determine how the portion of the test surface scatters and/or reflects radiation.

By using this ratio (or, more simply, the raw illumination intensity measured by the pre-map sensor) with the a priori information to calculate a required illumination setting for illuminating the portion of the test surface with the high resolution optical profiler sensor, it becomes easier to receive appropriate radiation at the high resolution optical profiler sensor. Trial measurement with the high resolution optical profiler sensor to determine the required illumination may therefore be omitted saving time and increasing the productivity of the optical profiler.

The ratio, pre-map sensor illumination level, a priori information, or the required illumination setting may be stored in a memory. The ratio, pre-map sensor illumination level, a priori information, or the required illumination setting may be retrieved from the memory during measurement with the high resolution optical profiler sensor.

The pre-map sensor may include a confocal sensor, a triangulation focus sensor, a knife edge focus sensor, a chromatic point sensor, a confocal sensor, a points/shape from focus sensor, a structured illumination microscopy sensor, a vertical image contrast through focus sensor or lateral image contrast through focus sensor. The high resolution optical profiling sensor may be a white light interferometry sensor, a phase-shifting interferometry sensor or a wavelength scanning interferometry sensor, a confocal sensor, a points from focus sensor, or a structured illumination microscopy sensor.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
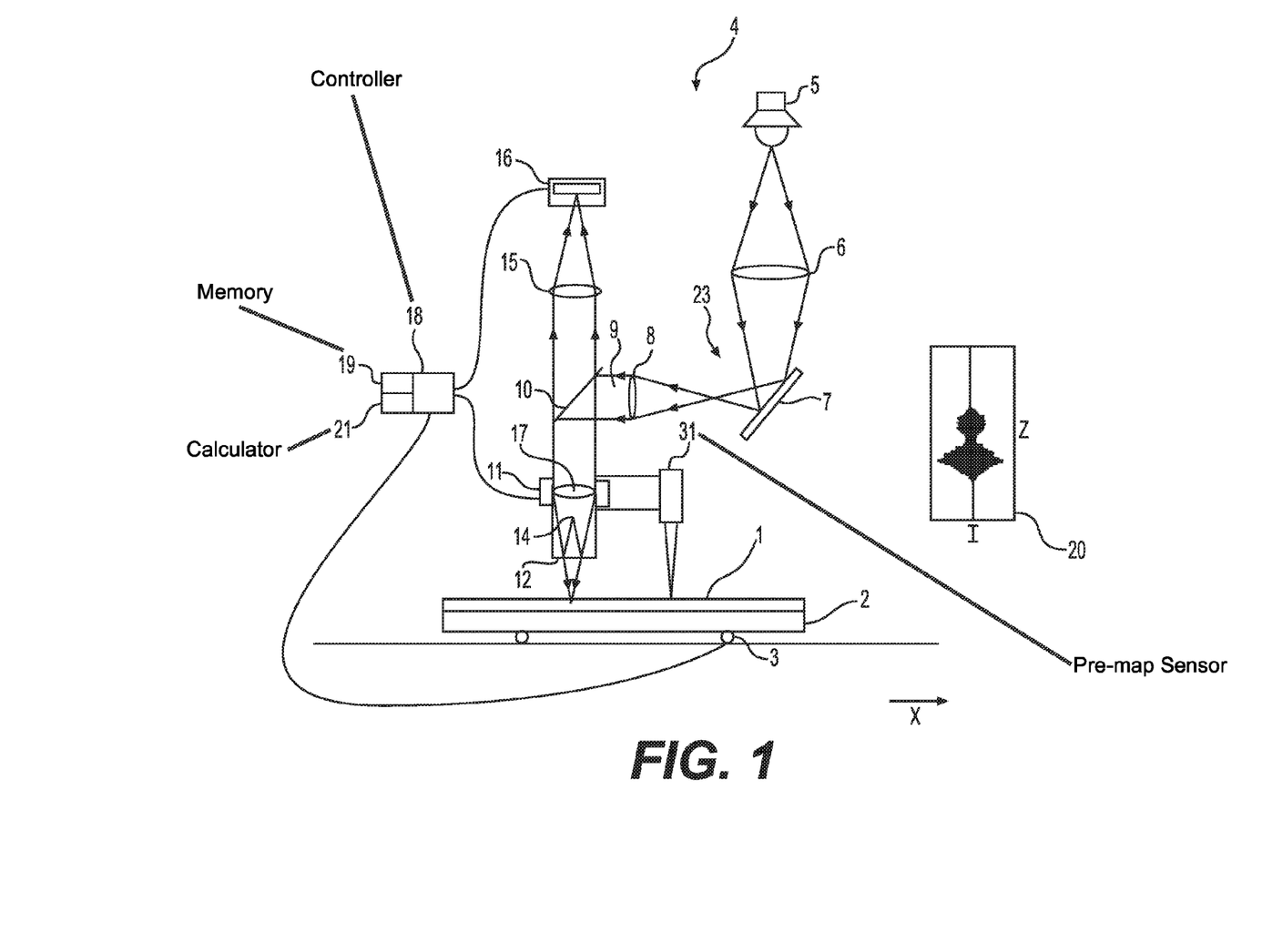
FIG. 1 depicts an interferometer apparatus according to a feature.

Referring to the drawings wherein like characters represent like elements, FIG. 1 depicts an interferometer apparatus 4 for determining a property of a sample according to a feature. The interferometer apparatus as depicted is a Mirau interferometer. Alternatively Michelson and/or Linnik interferometer apparatus may be used as well. Also, other optical profilers may be used.

The apparatus 4 may include a broadband illuminator 23 to provide a broadband illumination beam 9. The broadband illuminator may include a broadband radiation source 5, a first lens 6, a first mirror 7 and a second lens 8, to provide a broadband illumination beam 9. The broadband illumination beam may be parallel. The broadband illumination beam 9 may be reflected on a second beam splitter 10 and traverse through an objective lens 17 before it reaches a beam splitter 12 for splitting the broadband illumination beam in a reference beam and a measurement beam.

The reference beam may be reflected on a reference mirror 14. The measurement beam may reflect from a test surface of the sample 1. The beam reflected from the reference mirror 14 may reflect again on the beam splitter 12. The beam reflected from the test surface of the sample 1 may traverse through the beam splitter 12. The reference beam and the measurement beam may interfere and traverse through the objective lens 17, the second beam splitter 10 and the lens 15 to the detector 16. The intensity of the interference beam may be measured with the detector 16.

The reference mirror 14, the objective lens 17 and the beam splitter 12 may together form a Mirau objective and may be scanned with respect to the sample 1 along the optical axis of the objective lens 17 with a scanner 11.

The signal of each of the pixels of the optical sensor 16 may be read out to obtain a correlogram as depicted in box 20 in FIG. 1, which depicts an received intensity I as function of the Z-position Z of the sample. The apparatus may therefore be provided with a controller 18 for receiving for each pixel a signal representing the interference radiation intensity received on the detector 16 and a distance signal from the scanner 11 and combine both to a received correlogram 20 for each pixel displaying an interference radiation intensity as a function of the scanning distance from the sample 1. The controller 18 may calculate a high accuracy height map on the basis of the received correlogram.

The interferometer apparatus may be provided with a pre-map sensor 31 for measuring a distance and height variation (e.g. in Z) between the test surface of the sample 1 and the pre-map sensor 31. The sample 1 may be provided on a sample table 2, which is moveable in an X, Y direction perpendicular to the Z direction by a motor 3, for example a planar motor or an X-Y stage.

The pre-map sensor 31 may be an image sensor such as a CCD camera or any other imaging device for creating an image of the test surface. The image of the test surface may be used for inspection of the test surface on one hand and for measuring a distance between the test surface and the image sensor on the other hand.

The image sensor may be operably connected to a processor to process the images created with the image sensor to a distance between the image sensor and the test surface in the direction of the focal range. The processor may calculate a contrast of the image received from the test surface. The calculated contrast may, for example, be changed by moving the sample and the change may be processed by the processor to a distance between the test surface and the image sensor. Using a change of contrast of the image is a rather simple way to measure the distance between the sensor and the test surface.

The pre-map sensor 31 may be a triangulation focus sensor, edge knife focus sensor, chromatic point sensor, vertical image contrast through focus sensor, lateral image contrast through focus sensor, tactile sensor, and capacitive sensor. The triangulation focus sensor may include a radiation system to direct a radiation beam onto the test surface and a detector to receive a reflection of the radiation beam of the test surface. The position on the detector where the reflection on the detector is received is an indication of the distance between the pre-map sensor and the test surface. The radiation system may be a lamp, a light emitting diode, or a laser. The radiation system may provide a broadband radiation beam.

The pre-map sensor 31 may include a knife edge focus sensor, for example, using a Foucault configuration.

The pre-map sensor may include a chromatic point sensor. An example of such a sensor is described in U.S. Pat. No. 8,194,251 B2, the contents thereof being expressly incorporated herein by reference.

The pre-map sensor may include a tactile sensor or a capacitive sensor.

The pre-map sensor may include a confocal type of sensor. An example of such a sensor is described in US patent Application No. 2013/0271995 A1, the contents thereof being expressly incorporated herein by reference.

The interferometer apparatus 4 and the pre-map sensor 31 may be moveable in the Z-direction by a focus actuator, for example the scanner 11. The pre-map sensor 31 may measure a distance between the test surface of the sample 2 and the pre-map sensor 31. The measured distance may be forwarded to the controller 18 connected to the pre-map sensor. The controller 18 may compare the measured distance with a scanning range of the interferometer apparatus 4 which is stored in a memory 19 of the controller and may be pre-calibrated. The controller 18 may control the scanning means 11 to move the interferometer apparatus 4 in the Z direction to bring the test surface of the sample 1 into the scanning range of the interferometer apparatus 4. The controller 18 may also control the motor 3 in X (and if required also in Y) to bring the area which was previously underneath the focus sensor 31 underneath the objective 17 of the interferometer apparatus 4. The distance between the objective lens and the pre-map sensor 31 may therefore be calibrated and stored in the memory of the controller 18. Once the test surface previously underneath the pre-map sensor 31 is underneath the objective 17 the interferometer apparatus 4 may start irradiating the test surface from the broadband illuminator 23 and the scanner 11 may scan the test surface of the sample through the focal range of the interferometer apparatus 4. An interference pattern may be created on the detector 16 which as a function of the Z scan may create a correlogram 20.

In the above disclosure the interferometer apparatus 4 and the pre-map sensor 31 are moveable in Z while the sample table 2 is moveable in X and Y. Alternatively, the interferometer apparatus 4 may be constructed such that the interferometer apparatus and the pre-map sensor 31 are moveable in X, Y, and Z such that the sample table 2 may be stationary.

The sample table 2 may alternatively be moveable in X, Y, and Z such that the interferometer apparatus 4 and the pre-map sensor 31 do not need to be moved. The focus actuator may therefore move the sample and the sample table in the Z-direction. It may also be the case that the sample table and the interferometer apparatus 4 are both moveable in the Z direction for example that the sample table 2 is moveable over a considerable large range with a focus actuator in Z while the scanner 11 is only moving the interferometer apparatus 4 over a relatively short range.

During use of the apparatus a coarse height map in the Z-direction of a first section of the test surface with a pre-map sensor 31 provided to the optical profiler 4 may be measured. Subsequently the optical profiler will be moved with respect to the test surface of the sample 1 in a X and Y-direction, perpendicular to the Z-direction, to a subsequent section of the test surface. Again, a coarse height map in the Z-direction of the subsequent section of the test surface will be measured with the pre-map sensor. With the coarse height map of the first and subsequent section a trajectory in the X, Y, Z-direction for the optical profiler with respect to the test surface may be calculated with a calculator 21 provided to the controller 18 taking the focal range of the optical profiler into account, which may be stored in the memory 19.

The optical profiler will be moved with respect to the test surface in the X, Y, Z-direction according to the trajectory. A high accuracy height map of the first and subsequent section of the test surface will be measured with the optical profiler. The coarse height map in the Z-direction may be stored in the memory 19 provided to the controller 18 as a function of the X, Y-position of the first or the subsequent section of the test surface. During moving the optical profiler in the X, Y, Z-direction a focus actuator e.g. scanning means 11 may be used to move the test surface with respect to the optical profiler in the Z-direction.

Before calculating a trajectory in the X, Y, Z-direction for the optical profiler with respect to the test surface a distance between the pre-map sensor 31 and the focal range of the optical profiler may be calibrated. The calibrated distance between the pre-map sensor and the focal range of the optical profiler may be stored in the memory 19 provided to the controller 18. Calculating a trajectory in the X, Y, Z-direction for the optical profiler may include subtracting the calibrated distance between the pre-map sensor and the focal range of the optical profiler stored in the memory 19 from the coarse height map by the calculator 21. The method may be repeated for subsequent sections until the whole test surface of the sample 1 is measured.

As depicted the optical profiler is a white light interferometry apparatus however other optical profilers such as a phase-shifting interferometry apparatus or a wavelength scanning interferometry apparatus may also be used.

Figure 2:
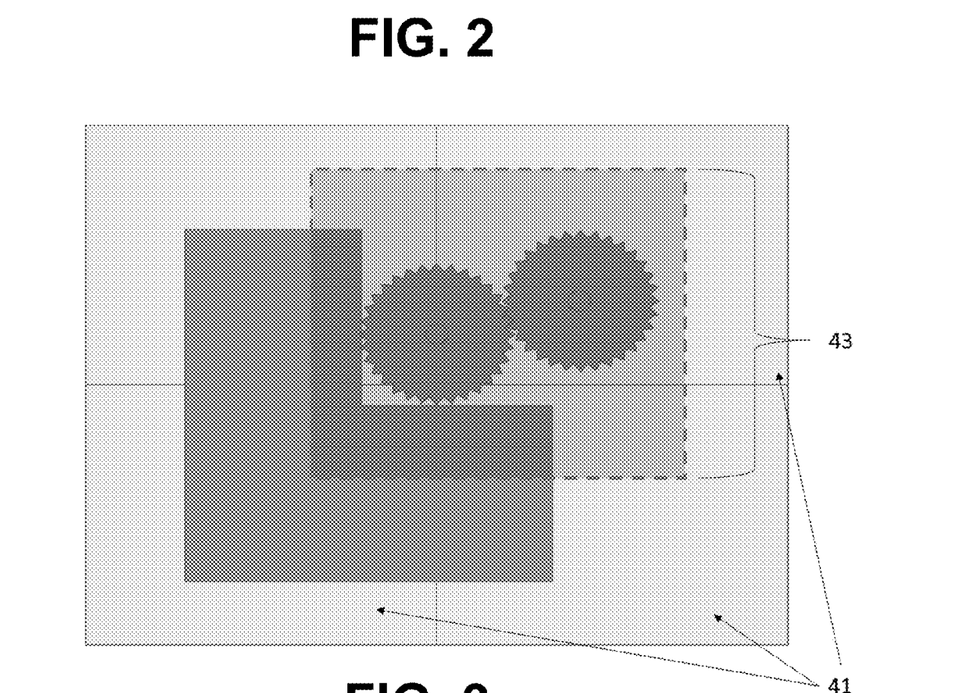
FIG. 2 depicts a view from the pre-map sensor displaying several adjoining fields of which an area of interest may be selected.

The controlling software for the example instrument above may be based on a graphical user interface (GUI). This may allow the presentation of the coarse height map from the pre-map sensor 31, or, in the case if an image sensor is used as a pre-map sensor, a presentation of the larger field of view image from the image sensor. It may be possible to present a display of several adjoining fields of view 41 from the pre-map sensor as in FIG. 2. The software may allow interactive on-screen selection of the field(s) of view 43 to be measured by the high-precision height map optical profiler, in this example, the interferometer. This may be done by a selection of an area of interest by user action.

Figure 3:
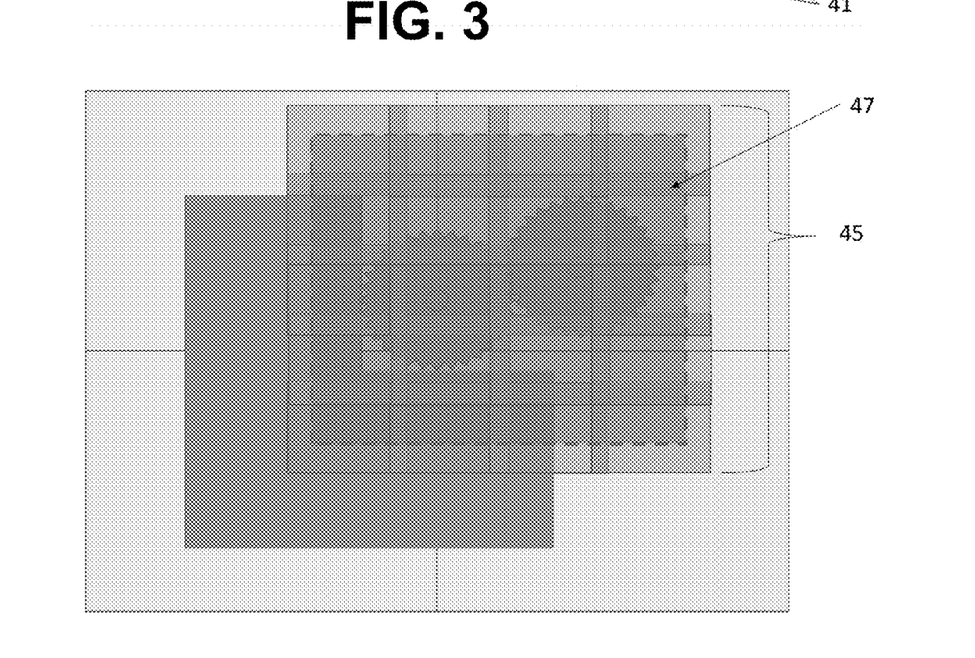
FIG. 3 depicts how the required field(s) of view may be distributed automatically over the area of interest.
Figure 4:
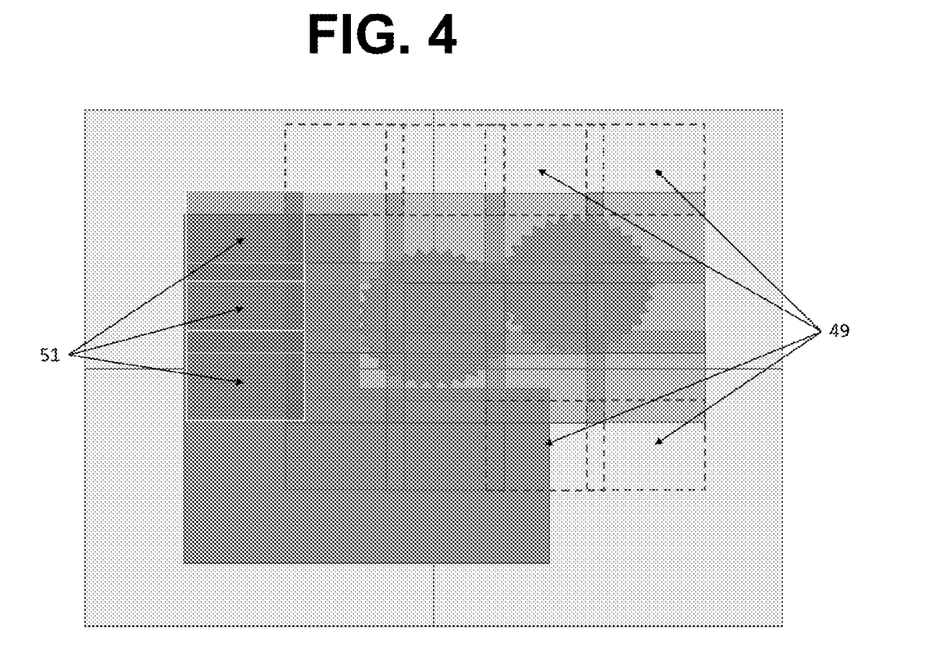
FIG. 4 depicts how field(s) of view may subsequently be deselected, or additional fields be created by user action.

Subsequently the required field(s) of view 45 of the interferometer may be distributed automatically appropriate to the area of interest (FIG. 3). The desired fields of view for measurement by the interferometer may be overlapping in a region 47, to enable stitching after measurement. The degree of overlap may be fixed, presenting the overlapped fields as a grid within the pre-map sensor field of view. Undesired field(s) of view 49 may subsequently be deselected by user action, or additional fields 51 created as desired may be selected by similar means (FIG. 4).

Figure 5:
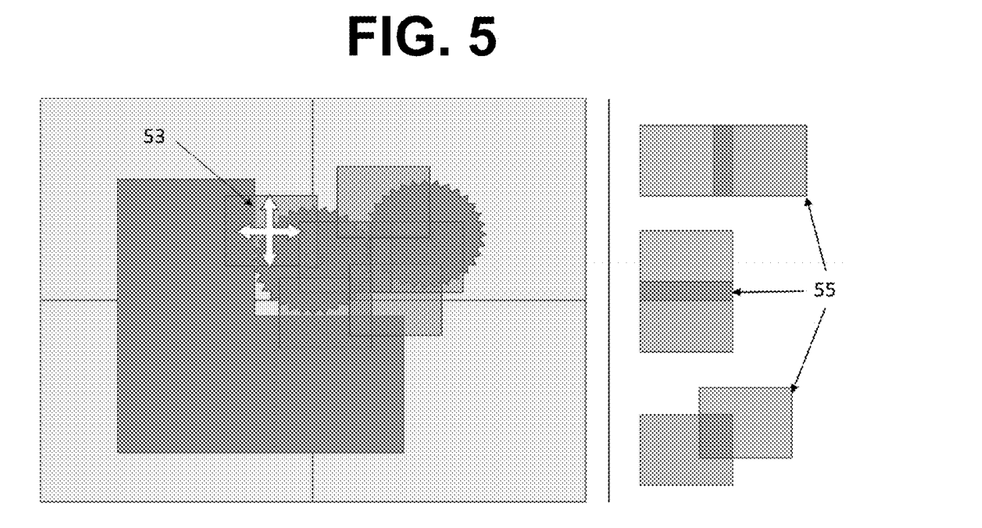
FIG. 5 depicts how the positioning and the overlap percentage of filed of view may be adjusted by user action; and, FIGS. 6a to 6f depict how the method can be used to make a real measurement.

Alternatively, the positioning and the overlap percentage (if any is desired) may be user specified via user action 53, to allow as much flexibility as possible (FIG. 5) and for example to avoid stitching problems on neighbouring field with a big height difference. Also a constant overlapping percentage 55 may be selected.

The mentioned user action for selection or deselection can be, but is not limited to, click, click and drag, key presses, joystick use, touch and tap, or any other such interaction with the controlling hardware and software.

Figure 6A:
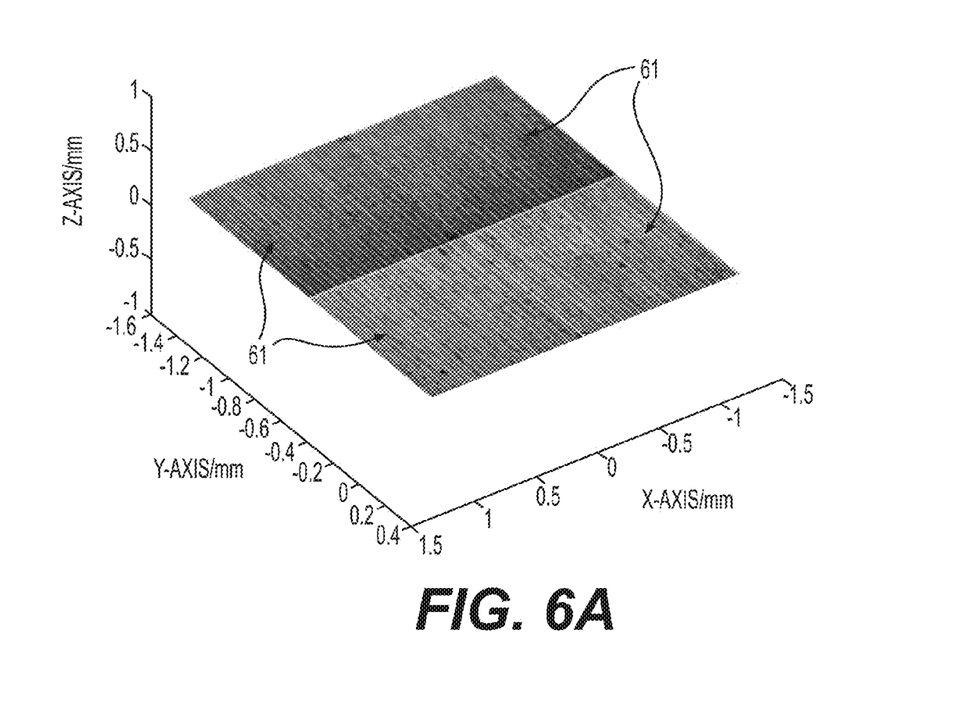
Figure 6B:
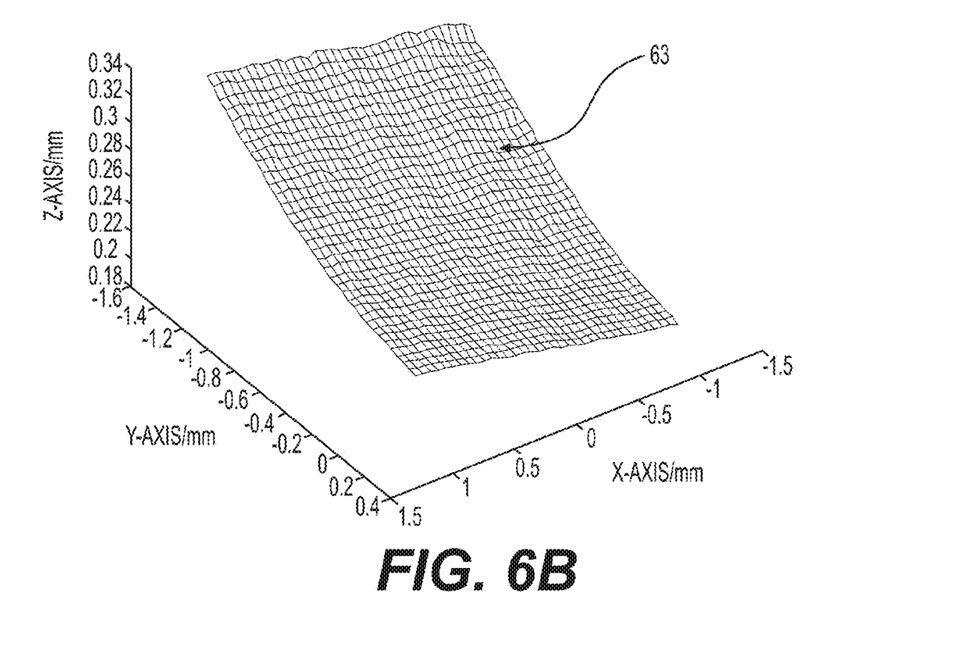
Figure 6C:
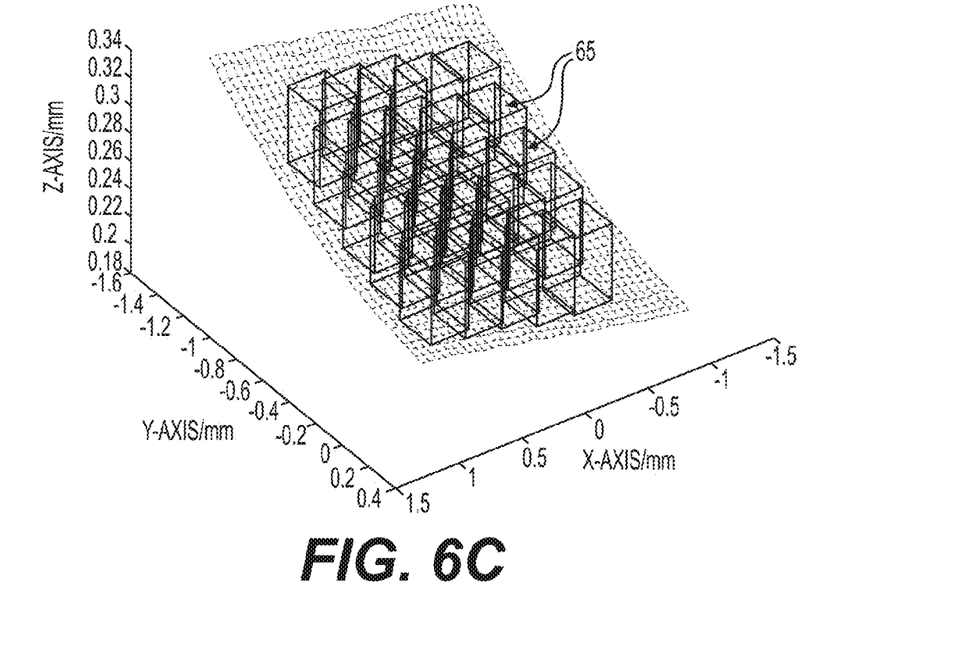
Figure 6D:
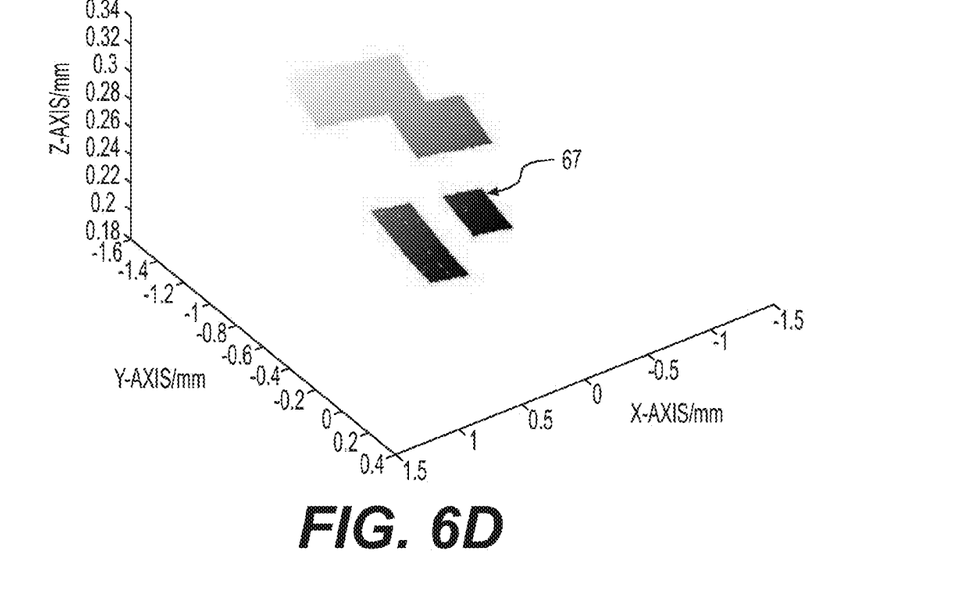
Figure 6E:
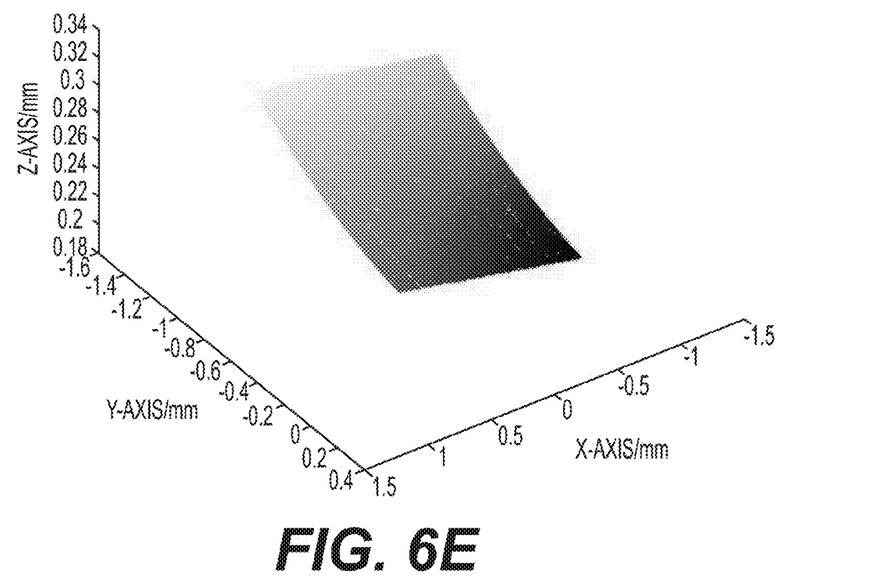
Figure 6F:
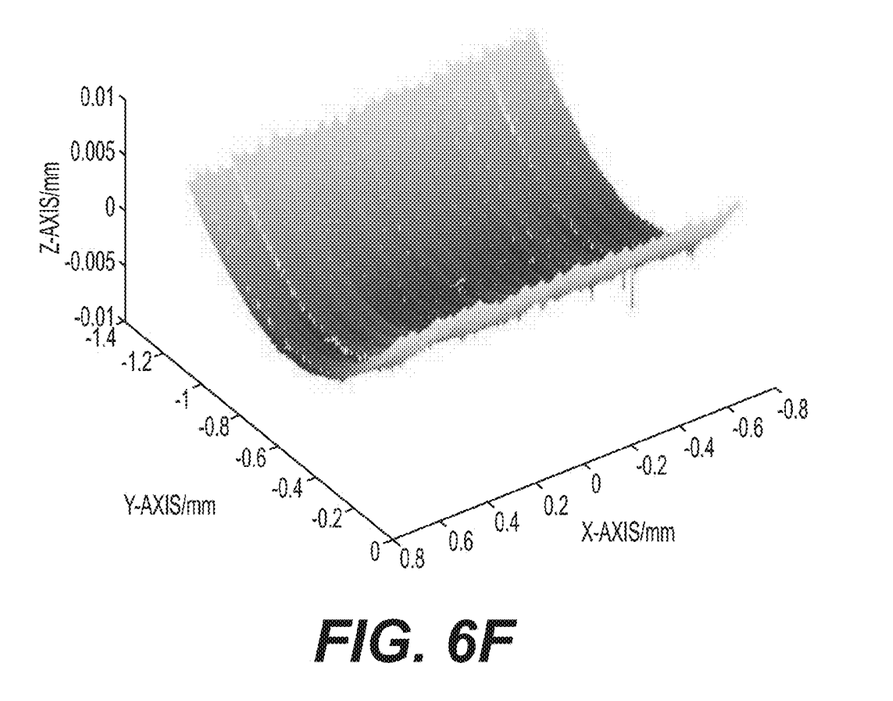

FIGS. 6a to 6f depict how the method can be used to make a real measurement. In FIG. 6a four measurement height maps 61 measured with a pre-map sensor provided to an optical profiler are combined in the coarse height map 63 of FIG. 6b and stored in a memory. The coarse height map of FIG. 6b is subdivided (see FIG. 6c) into sections 65 as appropriate for the field of view of a relatively high resolution optical profiler sensor provided to the optical profiler. Subsequently, the corresponding X, Y and Z positions for the high resolution optical profiler sensor with respect to the test surface and a trajectory in the X, Y, Z-direction for the high resolution optical profiler sensor with respect to the test surface is calculated. According to the trajectory the optical profiler is moved in the X, Y, Z-direction with respect to the test surface and a high accuracy height map 67 is measured (FIG. 6d) with the high resolution optical profiler sensor until the whole high accuracy height map test surface is measured and the individual fields are combined (FIG. 6e). A plane may be fitted through the height map and the fitted plane may be subtracted from the high accuracy height map to increase the resolution (FIG. 6f).

It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Furthermore, the terms and phrases used herein are not intended to be limiting, but rather, to provide an understandable description of the invention.

The terms "a" or "an", as used herein, are defined as one or more than one. The term another or subsequent, as used herein, is defined as at least a second or more. The terms including and/or having, as used herein, are defined as comprising (i.e., not excluding other elements or steps). Any reference signs in the claims should not be construed as limiting the scope of the claims or the invention. The mere fact that certain measures are recited in mutually different dependent claims does not indicate that a combination of these measures cannot be used to advantage. The scope of the invention is only limited by the following claims.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A method for measuring a high accuracy height map of a test surface using a multi sensor optical profiler, the optical profiler including a low resolution pre-map sensor and a high resolution optical profiling sensor having a resolution higher than a resolution of the low resolution pre-map sensor, comprising:

measuring a coarse height map of the test surface with the low resolution pre-map sensor at at least one of a working distance longer than a working distance of the high resolution optical profiling sensor and a field of view larger than a field of view of the high resolution optical profiling sensor;

storing the coarse height map in a memory;

subdividing the coarse height map into sections as appropriate for the field of view of the high resolution optical profiling sensor provided to the optical profiler;

calculating corresponding X, Y and Z positions for the high resolution optical profiling sensor with respect to the test surface;

calculating, using the calculated X Y Z positions, a trajectory in the X Y Z direction for the high resolution optical profiling sensor with respect to the test surface;

moving the optical profiler in the X, Y, Z-direction with respect to the test surface according to the trajectory; and, measuring, with the high resolution optical profiling sensor, a high accuracy height map having a higher accuracy than the coarse height map.

2. The method according to claim 1, wherein the low resolution pre-map sensor includes one of a confocal sensor, a triangulation focus sensor, a knife edge focus sensor, a chromatic point sensor, a confocal sensor, a points from focus sensor, a structured illumination microscopy sensor, a vertical image contrast through focus sensor, lateral image contrast through focus sensor, a tactile sensor, and a capacitive sensor.

3. The method according to claim 1, wherein the coarse height map from the low resolution pre-map sensor is composed of one of multiple merged, overlaid or joined individual measurements from the low resolution pre-map sensor.

4. The method according to claim 1, further comprising moving the test surface with respect to the optical profiler apparatus by actuating by X, Y and Z stages.

5. The method according to claim 1, wherein the calculating of the trajectory in the X Y Z direction comprises randomizing the order in which the high resolution optical profiling sensor measures a height map of the sections.

6. The method according to claim 1, wherein the calculating of the trajectory in the X Y Z direction comprises ordering the trajectory.

7. The method according to claim 1, wherein the subdividing results in the sections one of overlapping and adjoining.

8. The method according to claim 1, wherein the calculating of the trajectory in the X Y Z direction comprises subtracting the calibrated distance between the low resolution pre-map sensor and the high resolution optical profiling sensor from the coarse height map.

9. The method according to claim 1, wherein the measuring the high accuracy height map comprises scanning the test surface through the focal range of the high resolution optical profiling sensor.

10. The method according to claim 1, wherein the high resolution optical profiling sensor is one of a white light interferometry sensor, a phase-shifting interferometry sensor or a wavelength scanning interferometry sensor, a confocal sensor, a points from focus sensor, and a structured illumination microscopy sensor.

11. The method according to claim 1, further comprising:
allowing a user to view an image created by the low resolution pre map sensor;
allowing the user to one of select and deselect areas of interest from the image created by the low resolution pre-map sensor.

12. The method according to claim 2, further comprising:
allowing a user to view an image created by the low resolution pre map sensor;
allowing the user to one of select and deselect areas of interest from the image created by the low resolution pre-map sensor.

13. The method according to claim 3, further comprising:
allowing a user to view an image created by the low resolution pre map sensor;
allowing the user to one of select and deselect areas of interest from the image created by the low resolution pre-map sensor.

14. The method according to claim 4, further comprising:
allowing a user to view an image created by the low resolution pre map sensor;
allowing the user to one of select and deselect areas of interest from the image created by the low resolution pre-map sensor.

15. The method according to claim 5 further comprising:
allowing a user to view an image created by the low resolution pre map sensor;
allowing the user to one of select and deselect areas of interest from the image created by the low resolution pre-map sensor.

16. The method according to claim 6, further comprising:
allowing a user to view an image created by the low resolution pre map sensor;
allowing the user to one of select and deselect areas of interest from the image created by the low resolution pre-map sensor.

17. The method according to claim 7, further comprising:
allowing a user to view an image created by the low resolution pre map sensor;
allowing the user to one of select and deselect areas of interest from the image created by the low resolution pre-map sensor.

18. The method according to claim 8, further comprising:
allowing a user to view an image created by the low resolution pre map sensor;
allowing the user to one of select and deselect areas of interest from the image created by the low resolution pre-map sensor.

19. The method according to claim 9, further comprising:
allowing a user to view an image created by the low resolution pre map sensor;
allowing the user to one of select and deselect areas of interest from the image created by the low resolution pre-map sensor.

20. The method according to claim 10, further comprising:
allowing a user to view an image created by the low resolution pre map sensor;
allowing the user to one of select and deselect areas of interest from the image created by the low resolution pre-map sensor.

* * * * *